(12) United States Patent
Nakao

(10) Patent No.: US 6,369,906 B1
(45) Date of Patent: Apr. 9, 2002

(54) IMAGE REPRODUCTION APPARATUS AND METHOD FOR CONTROLLING IMAGE REPRODUCTION APPARATUS

(75) Inventor: Shuji Nakao, Kobe (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/192,708

(22) Filed: Nov. 16, 1998

(30) Foreign Application Priority Data

Nov. 18, 1997 (JP) .............................. 9-317232

(51) Int. Cl.⁷ .............................................. G06K 15/00
(52) U.S. Cl. ..................................... 358/1.15; 358/1.13
(58) Field of Search .............................. 358/1.15, 1.13, 358/1.14, 1.16, 1.17, 1.18, 1.1, 1.6, 1.9, 1.11, 1.2, 407, 468, 400, 401, 434–439, 500–501; 710/1, 8, 14, 15, 17, 18, 40, 59, 62, 72; 709/102, 103, 104

(56) References Cited

U.S. PATENT DOCUMENTS 5,668,936 A * 9/1997 Motooka et al. ........... 358/1.15
6,161,121 A * 12/2000 Hardy et al. ................ 709/104
6,216,176 B1 * 4/2001 Kadota ......................... 710/1

FOREIGN PATENT DOCUMENTS

| JP | 08123260 A | | 5/1996 |
| JP | 08166860 A | | 6/1996 |
| JP | 2001-166894 | * | 6/2001 |

* cited by examiner

Primary Examiner—Dov Popovici (57) ABSTRACT

An image reproduction apparatus having an exclusive use mode. The apparatus includes a communication unit and a controller. The communication unit communicates with a plurality of image sources. The controller sets the image reproduction apparatus in an exclusive use mode for being exclusively used by one of the image sources when the communication unit receives a request for exclusive use from the one of the image sources, and notifies the one of the image sources of a request for canceling the exclusive use mode through the communication unit when a predetermined condition is maintained under the exclusive use mode.

20 Claims, 7 Drawing Sheets

IMAGE REPRODUCTION APPARATUS AND METHOD FOR CONTROLLING IMAGE REPRODUCTION APPARATUS

This application is based on application No. H09-317232, filed in Japan, the contents of which are hereby incorporated by reference.

FIELD OF THE INVENTION

The present invention relates to an image reproduction apparatus capable of accepting image data from a plurality of image sources, more specifically an image reproduction apparatus having an exclusive use mode in which the image reproduction apparatus, having received from one image source a signal for exclusively using the image reproduction apparatus, does not accept image data from the other image sources. The invention also relates to a method for controlling the image reproduction apparatus.

BACKGROUND OF THE INVENTION

Figure 8:
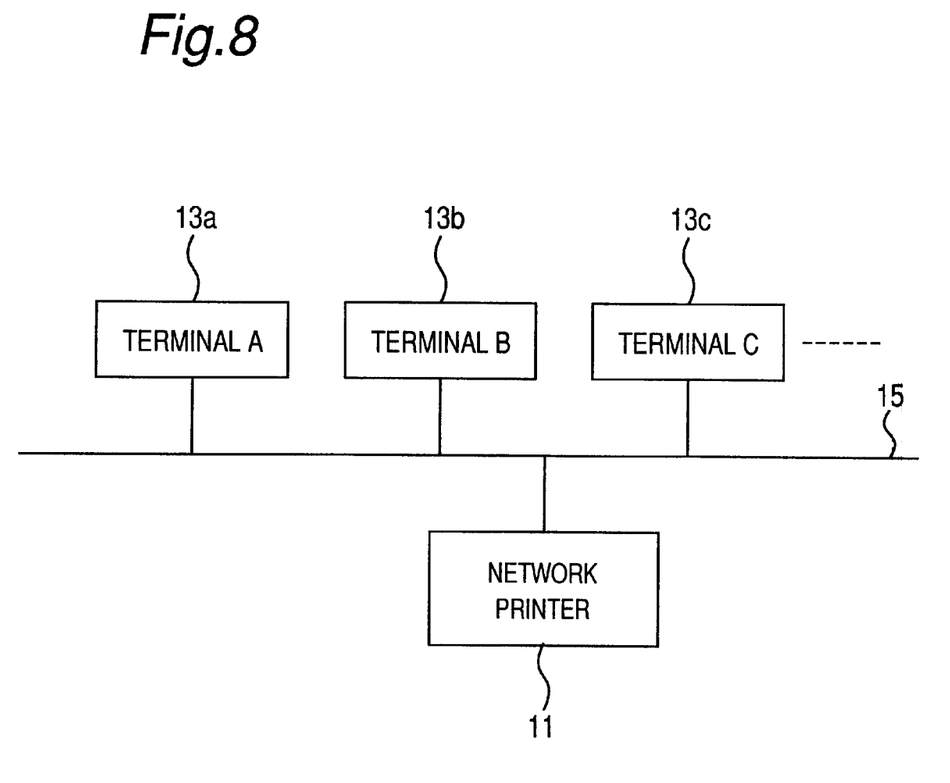
FIG. 8 is a view showing the constitution of a network comprising a plurality of terminals and a network printer.

In recent years, there has been found, in corporate or other offices, use of a plurality of information processors (terminals) connected to one another via a network such as a LAN (Local Area Network) as shown in FIG. 8. Generally, a printer connected to such a network is enabled to print upon accepting print requests from a plurality of information processors via the network.

Such a printer used via the network has various problems because of its being shared among a plurality of users. For example, when a user desires to print on specialty paper such as OHP paper, the user moves to the printer, sets the paper to the printer, then returns to the information processor and operates the information processor to start the print. In such a process, there occurs a time lag from the setting of paper to the starting of print. During this period, if another user makes a print request, the set specialty paper would be fed by this print job and used for printing. Thus, there exist problems that the time and labor by the user who has set the specialty paper would be in vain, and that, for the other user, undesired paper would be printed.

To solve these problems, there has been an invention disclosed in Japanese Patent Laid-Open Publication No. H08-166860. The printer of this invention has an exclusive use mode that is a mode in which the printer accepts a request only from a specific information processor. The user sets this printer to the exclusive use mode prior to the start of printing, temporarily occupying the printer for exclusive use and excluding print requests from the other information processors. Thus, occurrences of such trouble as described above are prevented.

However, the printer of the above invention has a problem that when the first user that has set the exclusive use mode forgets to cancel the exclusive use mode, it would be entirely impossible to print from any other information processor. Also, during the use of the printer in the exclusive use mode, when a request for a print job is issued from an information processor other than the information processor to which the exclusive use mode has been set, this print job is rejected, making it necessary to execute the procedure for starting print from the other information processor once again. In this case, when the exclusive use mode is prolonged, the other user may issue the print request again and again during the period, which would result in a waste of time and labor for the other user. Such a problem is opposite to the original purpose of the network printer intended for effective use of the printer by connecting the printer to a network and sharing it among a plurality of information processors.

SUMMARY OF THE INVENTION

An object of the present invention is to provide an image reproduction apparatus which is convenient to use for a plurality of users.

A further object of the present invention is to provide a network printer having an exclusive use mode, the printer being improved in use efficiency by preventing the exclusive use mode from being left without care, as well as a method for controlling a print job for the network printer.

A further object of the present invention is to provide a method for controlling an image reproduction apparatus capable of accepting image data from a plurality of image sources.

To achieve the above objects, in the first aspect of the invention, an image reproduction apparatus reproduces an image based on image data sent from either one of a plurality of image sources. The image reproduction apparatus comprises a communication unit and a controller. The communication unit communicates with the plurality of image sources. The controller sets the image reproduction apparatus in an exclusive use mode for being exclusively used by one of the image sources when the communication unit receives a request for exclusive use from the one of the image sources, and notifies the one of the image sources of a request for canceling the exclusive use mode through the communication unit when a predetermined condition is maintained under the exclusive use mode.

In the second aspect of the invention, an image reproduction apparatus reproduces an image based on image data sent from either one of a plurality of image sources. The image reproduction apparatus comprises a communication unit and a controller. The communication unit communicates with the plurality of image sources. The controller sets the image reproduction apparatus in an exclusive use mode for being exclusively used by one of the image sources when the communication unit receives a request for exclusive use from the one of the image sources, and cancels the exclusive use mode automatically and compulsorily when a predetermined condition is maintained under the exclusive use mode.

In the third aspect of the invention, an image reproduction apparatus reproduces an image based on image data sent from either one of a plurality of image sources. The image reproduction apparatus comprises a communication unit and a controller. The communication unit communicates with the plurality of image sources. The controller sets the image reproduction apparatus in an exclusive use mode for being exclusively used by one of the image sources when the communication unit receives a request for exclusive use from the one of the image sources, and cancels the exclusive use mode when the communication unit receives a request for an image reproduction from the other one of the image sources under the exclusive use mode.

In the fourth aspect of the invention, an image reproduction apparatus reproduces an image based on image data sent from either one of a plurality of image sources. The image reproduction apparatus comprises a communication unit and a controller. The communication unit communicates with the plurality of image sources. The controller sets the image reproduction apparatus in an exclusive use mode for being exclusively used by one of the image sources when the communication unit receives a request for exclusive use from the one of the image sources, and cancels the exclusive use mode when the communication unit receives a request for an image reproduction from the other one of image sources under the exclusive use mode.

In the fifth aspect of the invention, a method controls an image reproduction apparatus for reproducing an image based on image data sent from either one of a plurality of image sources. The method comprises the steps of: (a) setting the image reproduction apparatus in an exclusive use mode for being exclusively used by one of the image sources when a request for exclusive use from the one of the image sources is received; and (b) notifying the one of the image sources of a request for canceling the exclusive use mode when a predetermined condition is maintained under the exclusive use mode.

In the sixth aspect of the invention, a method controls an image reproduction apparatus for reproducing an image based on image data sent from either one of a plurality of image sources. The method comprises the steps of: (a) setting the image reproduction apparatus in an exclusive use mode for being exclusively used by one of the image sources when a request for exclusive use from the one of the image sources is received; and (b) canceling the exclusive use mode automatically and compulsorily when a predetermined condition is maintained under the exclusive use mode.

BRIEF DESCRIPTION OF THE DRAWINGS

A better understanding of the invention will be obtained by reading the description of the invention below, with reference to the following drawings, in which.

DETAILED DESCRIPTION OF THE PREFERRED EMBODIMENTS

Hereinbelow, an embodiment of the network printer according to the present invention is described with reference to the accompanying drawings.

The network printer of the present embodiment, like the one described in the prior art, is connected to a network 15 and used as shown in FIG. 8, and accepts a print request from a plurality of terminals (terminal A, terminal B, . . . ) 13a, 13b, . . . as image sources connected to the network 15. Also, the network printer 11 has an exclusive use mode for accepting a print request only from a specific image source. Hereinbelow, constitution and operation of the network printer will be described in detail.

<Constitution of the Network Printer>

Figure 1:
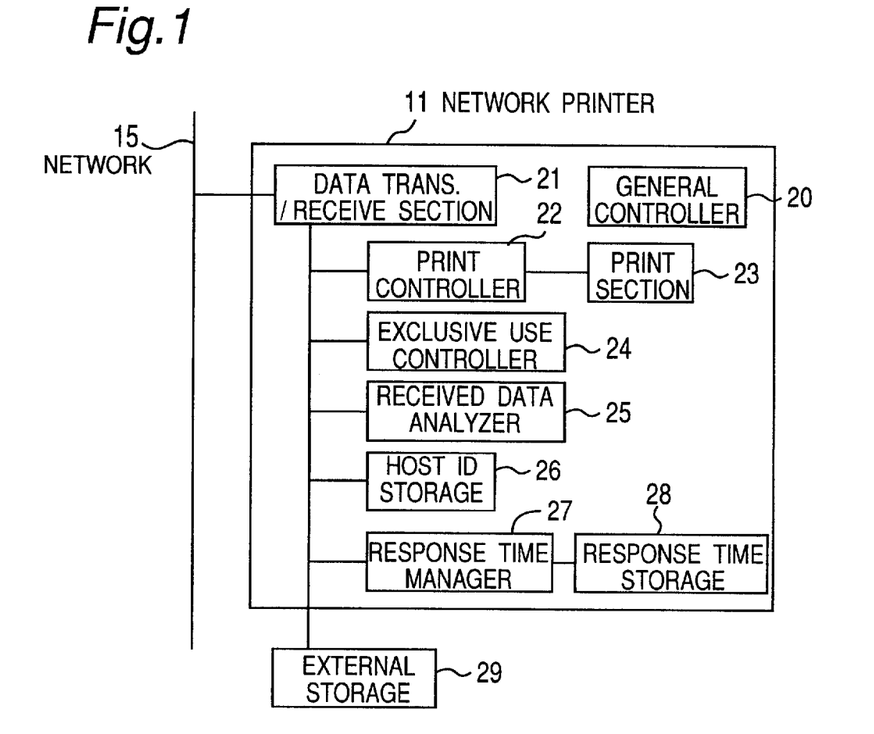
FIG. 1 is a schematic block diagram of a network printer of the preferred embodiment according to the invention.

FIG. 1 shows a schematic block diagram of the network printer 11. The network printer 11 comprises a data transmit/receive section 21, a print controller 22, a print section 23, an exclusive use controller 24, a received data analyzer 25, a host ID storage 26, a response time manager 27 and a response time storage 28. The data transmit/receive section 21 communicates with the terminals 13a, 13b, . . . or transmits/receives data to/from the terminals 13a, 13b, . . . via the network 15. The print controller 22 controls the printing operation and is connected to the print section 23 that actually prints onto paper, i.e. forms images on sheets. The exclusive use controller 24 controls the operation for setting, canceling and the like of the exclusive use mode. The received data analyzer 25 analyzes received data, identifies and the like of instructions and print data contained in the received data. The host ID storage 26 stores the identification number of a terminal by which the exclusive use mode has been set, and the response time manager 27 manages the response time or the like. The response time manager 27 is connected to the response time storage 28 that stores response time. Also, the data transmit/receive section 21 is connected to an external storage 29 provided for temporary storage of received data. The external storage 29 comprises an information medium, such as a hard disk, a floppy disk, a CD, a DVD or other optical disk, and a drive therefor.

Further, the network printer has a general controller 20 for controlling the individual sections 21 to 29. The general controller 20 includes a CPU, a ROM and a RAM. The CPU, while using the RAM as a work area, executes control programs stored in the ROM, thereby controlling the individual sections 21 to 29.

The network printer of this embodiment constructed as described above operates as follows. That is, in a case where the exclusive use mode is set, the network printer notifies the terminal exclusively using the network printer of a request for canceling the exclusive use mode when a predetermined time has elapsed after a predetermined process such as the setting of the exclusive use mode, or when a print request is issued from a terminal other than the terminal exclusively using the network printer. This prevents the exclusive use mode from being left without care, thus allowing an effective use of the network printer.

<Operation of the Network Printer>

The control operation to be executed by the general controller 20 of the network printer 11 is described below with reference to the flow charts.

Figure 2:
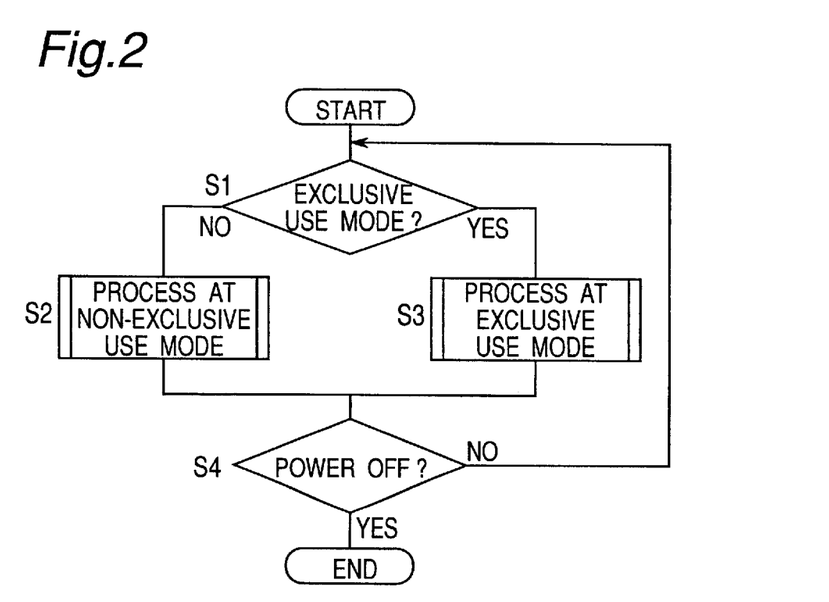
FIG. 2 is a flow chart of the main process of the network printer.

FIG. 2 is a flow chart showing the main process of the network printer 11. This process is executed iteratively while the network printer 11 is kept switched on. In this process, first, the exclusive use controller 24 determines whether or not the network printer 11 is in the exclusive use mode (S1). When the network printer 11 is not in the exclusive use mode, a process (S2) at the non-exclusive use mode is executed, or when the network printer 11 is in the exclusive use mode, a process (S3) at the exclusive use mode is executed. After that, it is determined whether or not the network printer 11 has been powered off (S4). When the network printer 11 has been powered on, the program returns to the step S1, where the foregoing process is iterated, or when the network printer 11 has been powered off, the program is ended.

The process (S2) at the non-exclusive use mode and the process (S3) at the exclusive use mode are described in detail below.

<Process at Non-Exclusive Use Mode>

Figure 3:
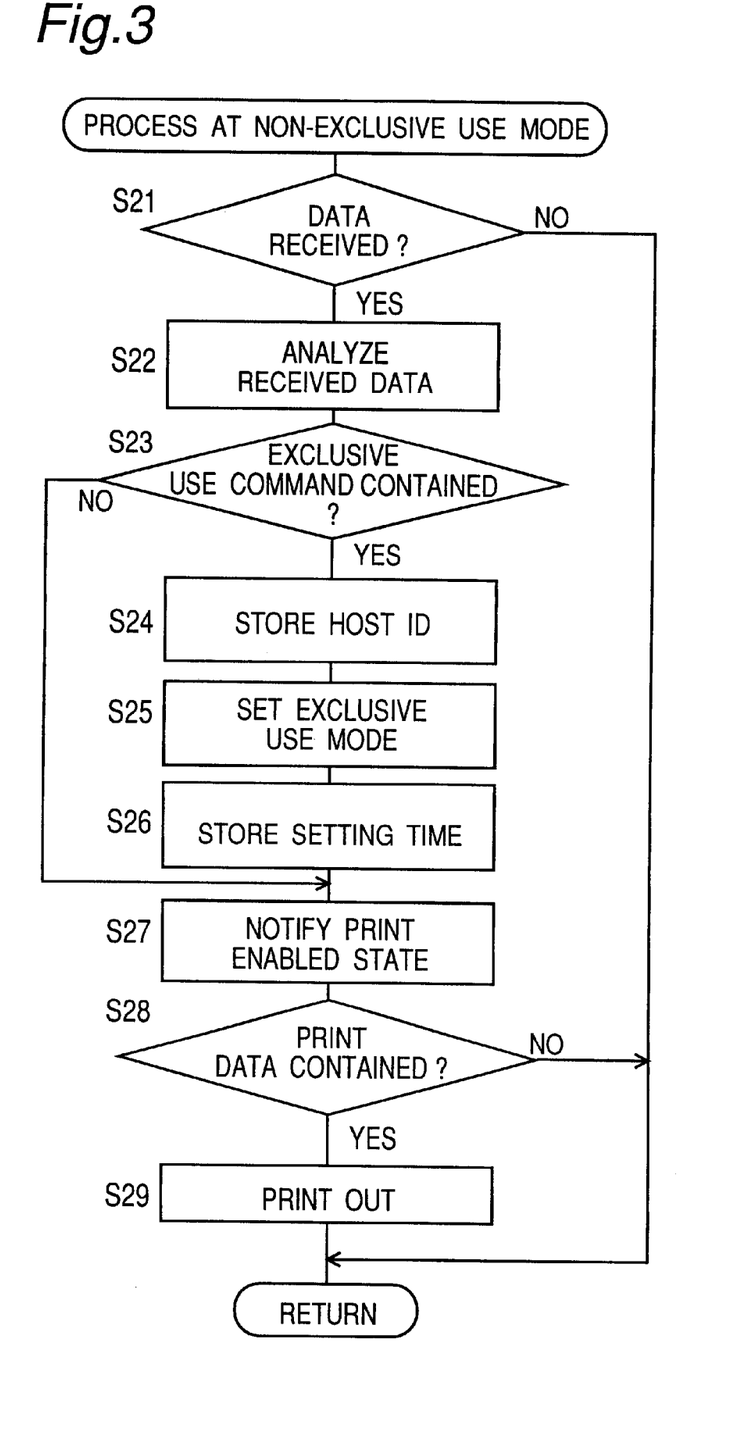
FIG. 3 is a flow chart of the process in the non-exclusive use mode.

The process (S2) at the non-exclusive use mode is described first. In this process, a predetermined process is executed, which is performed in a case where the network printer 11 that is not in the exclusive use mode receives a print request from a terminal.

That is, in this process routine, when a command for putting the network printer 11 into the exclusive use mode (hereinafter, referred to as "exclusive use command") is contained in data received from a terminal, then the network printer 11 is set to the exclusive use mode. When print data is contained in the received data, a process of printing out the print data is executed.

This process is explained concretely with reference to the flow chart of FIG. 3. First, it is decided whether or not the data transmit/receive section 21 has received data from the terminal 13a . . . connected to the network 15 (S21). If the data transmit/receive section 21 has not received data, the program returns, ending this process. When the data transmit/receive section 21 has received data, the received data analyzer 25 analyzes the received data (S22), and then it is decided whether or not the exclusive use command is contained in the received data (S23).

When the exclusive use command is not contained, the program goes to step S27. When the exclusive use command is contained, the identification number (hereinafter, referred to as "host ID number") of the terminal (hereinafter, referred to as "data transmitting terminal") that has transmitted the data is read out from among the received data, and stored in the host ID number storage 26 (S24). After that, the exclusive use controller 24 sets the network printer 11 to the exclusive use mode (S25), stores the time of this setting to the response time storage 28 (S26), and goes to step S27. The time stored in the response time storage 28 is referenced at the time of a request for canceling the exclusive use mode described later. Here, the host ID number may be a sequential number assigned to each terminal, IP address or a terminal name expressed by alphanumeric characters or katakana (square Japanese characters) etc.

At step S27, the exclusive use controller 24 notifies the data transmitting terminal of a print enabled state (or a receive enabled state). Then, it is decided whether or not print data is contained in the received data (S28). When print data is not contained in the received data, the program returns. When print data is contained, the print controller 22 controls the print section 23 to print (S29), followed by a return.

<Process at Exclusive Use Mode>

Figure 4:
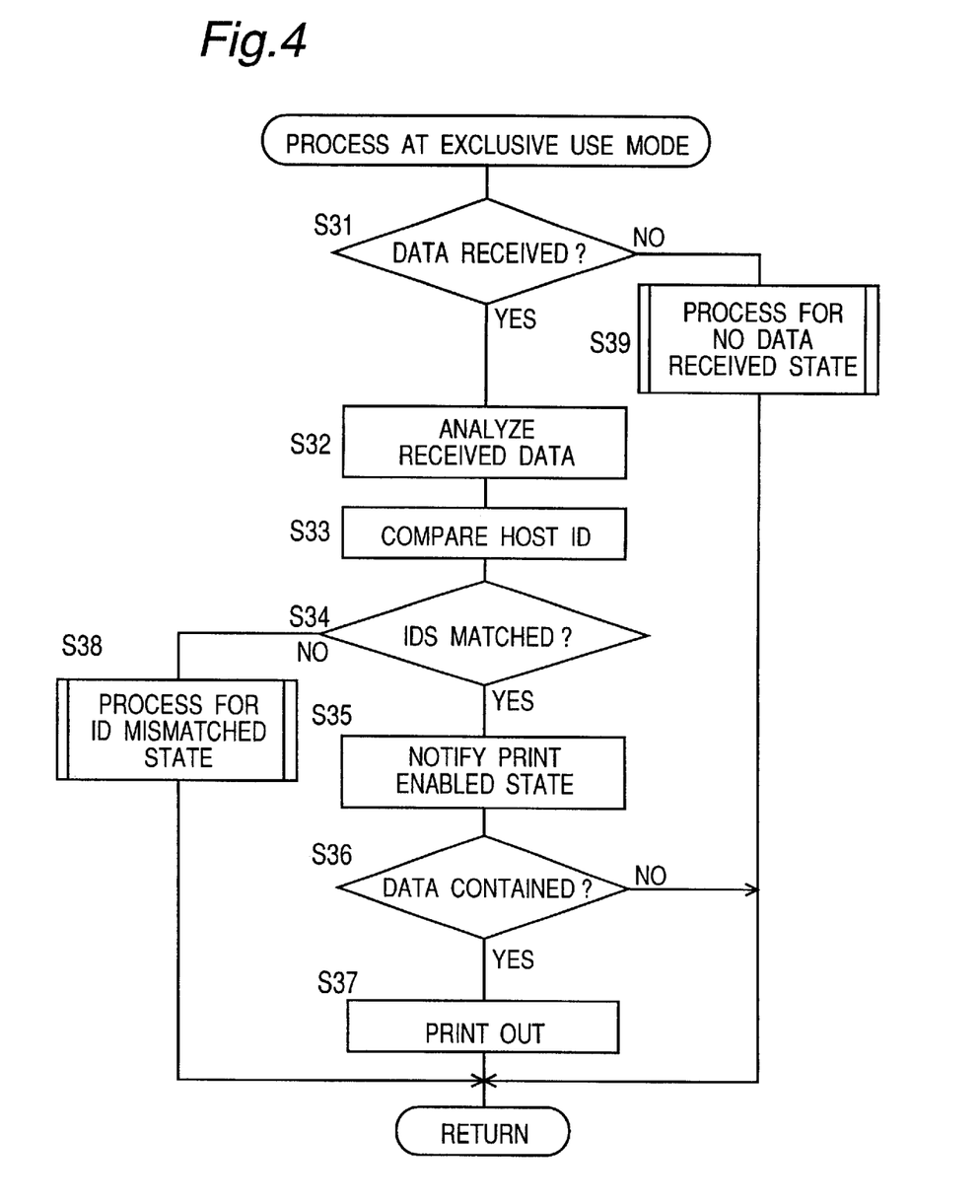
FIG. 4 is a flow chart of the process in the exclusive use mode.

The process (step S3) at the exclusive use mode is described next. In this process, a predetermined process is executed, which is preformed in a case where the network printer 11 in the exclusive use mode receives a print request from a terminal.

That is, in this process routine, in the exclusive use mode, when the network printer 11 has not received data from any terminal, a "process for no data received state" is executed. With data reception, when the received data is from the exclusive-use terminal, the data is printed out, or when the received data is not from the exclusive-use terminal, a "process for ID mismatched state" is executed.

This process is now explained concretely with reference to the flow chart of FIG. 4. First, it is decided whether or not the data transmit/receive section 21 has received data (S31). When the data transmit/receive section 21 has not received data, the process for no data received state (S39) is executed. This process will be described later.

Meanwhile, when the data transmit/receive section 21 has received data, the received data analyzer 25 analyzes the received data (S32), reads out the host ID number from the received data, compares the read host ID number with the ID number stored in the host ID number storage 26 (S33), and decides the comparison result (S34). As a result, when the two ID numbers do not match each other, the process at ID mismatched state (S38) is executed. Details of this process are described later.

Meanwhile, as a result of the comparison, if the two ID numbers matched each other (in which case because the data transmitting terminal is the exclusive-use terminal, printing is enabled of course), the exclusive use controller 24 notifies the data transmitting terminal of the print-enabled state (S35). Then, it is determined whether or not print data is contained in the received data (S36). When print data is contained in the received data, the print controller 22 controls print section 23 to print data out (S37), followed by a return. When print data not contained, the program returns without printing operation.

The "process for ID mismatched state (S38)" and the "process for no data received state (S39)" in the exclusive use mode are described below.

<Process for ID Mismatched State>

Figure 5:
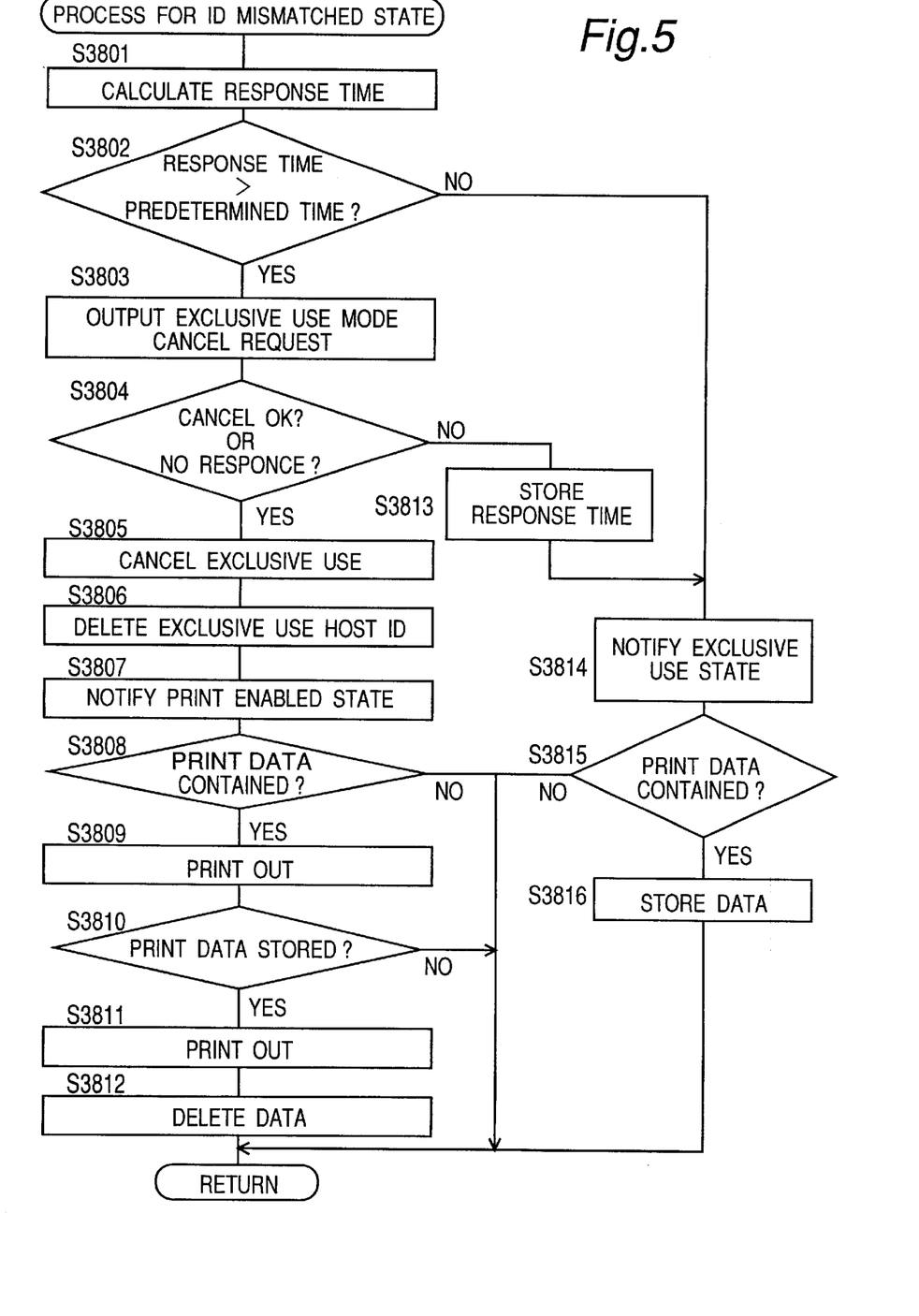
FIG. 5 is a flow chart of the process upon a unmatched identification number.

In this process routine, a predetermined process is executed, which is performed in a case where a print request has occurred from a terminal other than the terminal (hereinafter, referred to as "exclusive-use terminal") that is exclusively using the printer in the exclusive use mode.

More specifically, the following three processes 1–3 are executed:

(Process 1): to output an exclusive-use canceling request for requesting the cancellation of the exclusive use mode to the exclusive-use terminal, in the event of a print request from a terminal different from the exclusive-use terminal.

(Process 2): to cancel the exclusive use mode, when a permission response to the exclusive-use canceling request is made, or when no response to the exclusive-use canceling request is made for more than a predetermined time since the output of the exclusive-use canceling request, (Process 3): to store print data in the external storage 29 so as to print out stored data after the cancellation of the exclusive use mode when a rejection response to the exclusive-use canceling request is made.

Now this process is explained concretely with reference to the flow chart of FIG. 5. First, the response time manager 27 calculates a response elapsed time based on the time stored in the response time storage 28 (S3801). In the response time storage 28, either the time at which the exclusive use mode was set (the time being stored at step 26) or a time (described later) at which a response to the canceling request is received has been stored. At step S3801, an elapsed time from the time stored in the response time storage 28 until the current time is calculated as a response elapsed time. Accordingly, the response elapsed time represents the time that has elapsed since the setting of the exclusive use mode, or the time that has elapsed since the last response to the canceling request.

Figure 6:
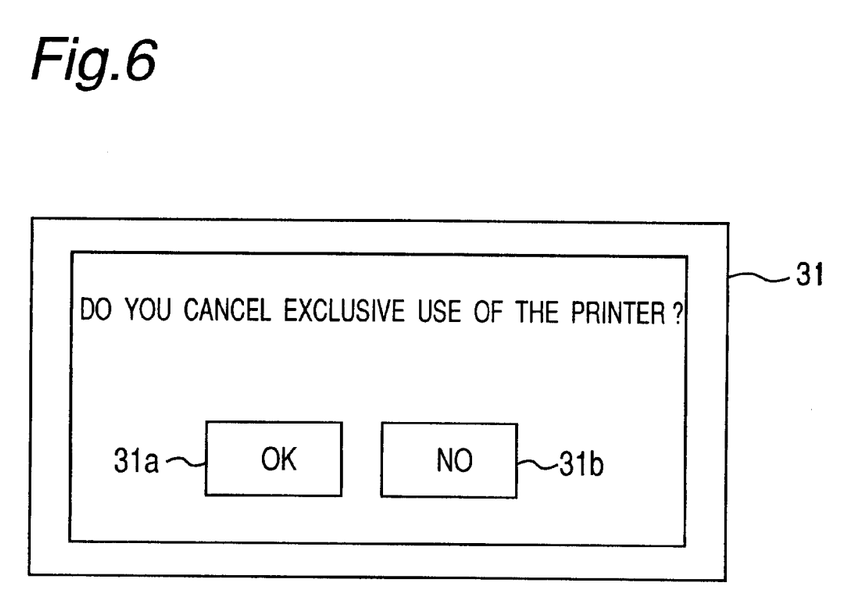
FIG. 6 is a display screen of a message of a request for canceling.

Next, the response time manager 27 decides whether or not the response elapsed time exceeds a predetermined time (S3802). When the response elapsed time not exceeding the predetermined time, the program goes to step S3814. When the response elapsed time exceeding the predetermined time, the exclusive-use canceling request for requesting the canceling of the exclusive use mode is issued to the exclusive-use terminal (S3803). In this way, an exclusive-use canceling request is output to the exclusive-use terminal (Process 1). Then, the exclusive-use terminal, upon receiving the exclusive-use canceling request, displays a message such as shown in FIG. 6 on the display screen, waiting for a response input by the user. Usually, the user inputs a response to permit ("OK" in this case) or reject ("NO" in this case) the canceling of the exclusive use mode in reply to this message. Upon the response being input, the exclusive-use terminal transmits this response to the network printer 11 via the network 15.

After the exclusive-use canceling request being output (S3803), the exclusive use controller 24 decides whether or not the response from the exclusive-use terminal has been received within a predetermined time (S3804). Or, when the exclusive use controller 24 receives the response, it decides whether or not the response is a "permission (OK)" or a "rejection (NO)" for the cancel of the exclusive use (S3804). When a response to permit the cancel has been made within the predetermined time, or when no response has been made even after the elapse of the predetermined time ("YES" at step 3804), the exclusive use controller 24 cancels the exclusive use mode (S3805). Like this, when a response to permit the cancel has been made, or when no response has been made, the exclusive use mode is canceled (Process 2). Subsequently, the host ID number of the exclusive-use terminal stored in the host ID number storage 26 is deleted (S3806), and the data transmitting terminal is notified of the print-enabled state (S3807).

Next, it is determined whether or not print data is contained in received data (S3808). When no print data contained, then the program returns. When print data contained, the print controller 22 executes print operation (S3809). Subsequently, it is determined whether or not data to be printed is stored in the external storage 29 (S3810). When print data not stored, the program returns. When print data stored, print operation is executed (S3811). After the completion of the print operation, this print data is deleted from the external storage 29 (S3812).

Meanwhile, at step S3804, when the response from the exclusive-use terminal is a rejection to the canceling of the exclusive use mode, the response time at that time is stored in the response time storage 28 by the response time manager 27 (S3813), where the program goes to step S3814.

At step S3814, the data transmitting terminal is notified that the network printer 11 is under the exclusive use mode set by another terminal. Subsequently, it is decided whether or not print data is contained in the received data (S3815). When the print data contained, the print controller 22 stores the print data in the external storage 29 (S3816), followed by a return. In this way, in the event of a print request from a user other than the exclusive-use user in the exclusive use mode, print data is stored in the external storage 29 (Process 3).

<Process for No Data Received State>

Figure 7:
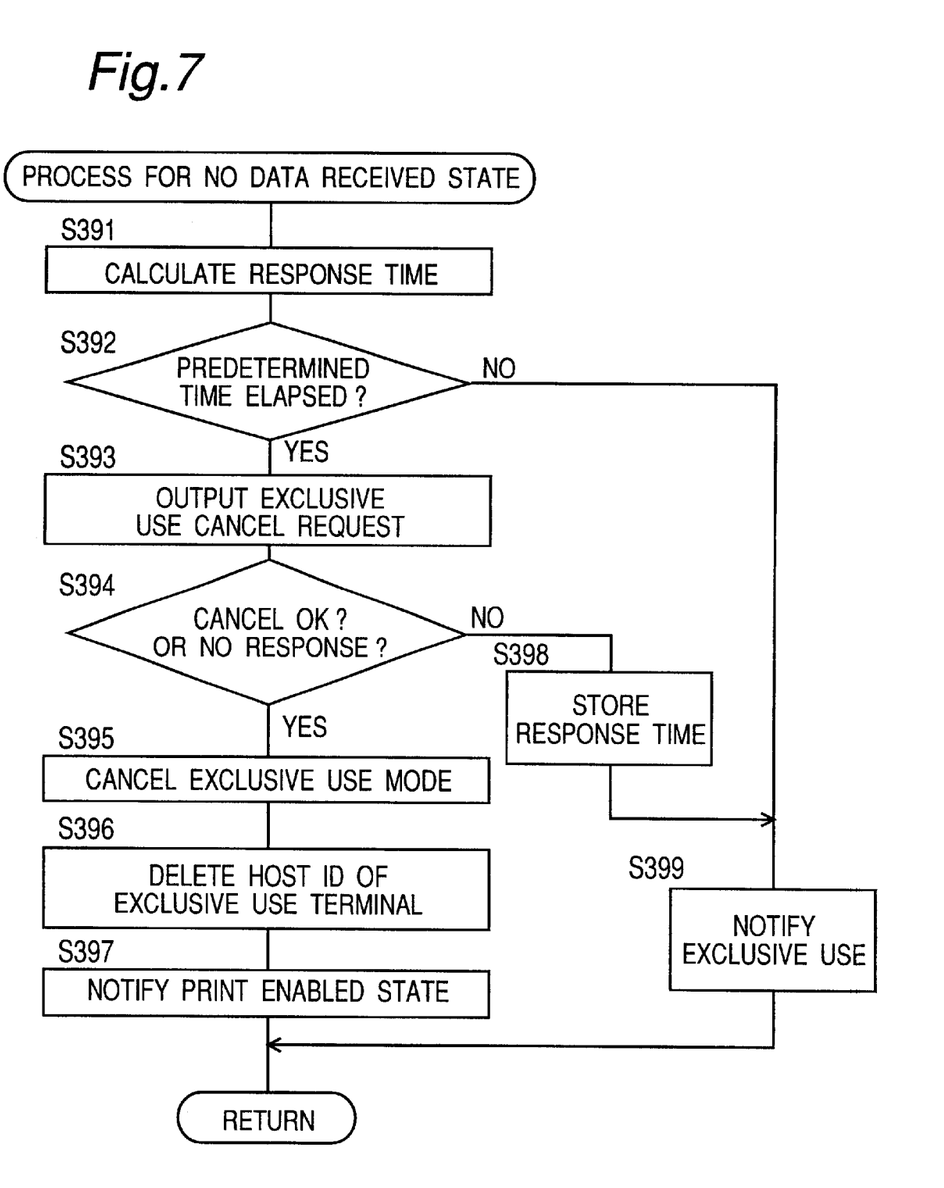
FIG. 7 is a flow chart of the process with data unreceived.

Next, the process for no data received state (S39) in the exclusive use mode is explained. In this process routine, a predetermined process is executed, which is to compulsorily cancel the exclusive use mode when no print request has been issued from the exclusive-use terminal for a predetermined time in the exclusive use mode.

That is, in the process for no data received state, the exclusive use mode is canceled:

(a) when a cancellation-permitting response to a canceling request is received;

(b) when no print request from the exclusive-use terminal has been issued for a predetermined time since the setting to the exclusive use mode or since the last reception of a response to the canceling request; or (c) when no response to the canceling request has been issued for a predetermined time since the canceling request was transmitted.

As a result, an uncared-for leaving of the exclusive use mode can be prevented and an effective use of the network printer can be made.

Now, this process is explained concretely with reference to the flow chart of FIG. 7. First, the response time manager 27 calculates the response elapsed time based on the time stored in the response time storage 28 (S391). Subsequently, it is decided whether or not the response elapsed time exceeds a predetermined time (S392). When the response elapsed time does not exceed the predetermined time, the program goes to step S399.

When the response elapsed time exceeds the predetermined time, the response time manager 27 outputs an exclusive-use canceling request to the exclusive-use terminal (S393). The exclusive use controller 24 decides whether or not a response from the exclusive-use terminal is made within a predetermined time, and also whether or not the response is a "permission (OK)" or a "rejection (NO)" for exclusive-use cancellation (S394). When a response to permit the cancel of the exclusive use mode is received from the exclusive-use terminal within the predetermined time or when no response from the exclusive-use terminal is made even after the elapse of the predetermined time, the exclusive use mode of the network printer 11 is canceled (S395). Then, the host ID number of the exclusive-use terminal stored in the host ID storage 26 is deleted (S396). After that, the data transmitting terminal is notified of a print-enabled state (S397), followed by a return.

Meanwhile, when the response to the exclusive-use canceling request is a rejection at step S394, the response time manager 27 stores in the response time storage 28 the time at which the response is received (S398), and notifies the data transmitting terminal that the printer is exclusively used by another terminal (S399), followed by a return.

The above embodiment has been described, by way of example, on a network printer, as an image reproduction apparatus, which is connected to a plurality of terminals as image sources, via a network. However, the present invention is not limited to this. For example, the image reproduction apparatus may be a composite machine having both printer and copy functions. In this case, the exclusive use mode may appropriately be set by an input fed prior to a copying instruction from an operation panel provided in conjunction with an image reading unit, for example, inputs for the scaling factor of copy, the paper size and the number of copies.

With the network printer as well as the method for controlling jobs therefor according to the present invention, the following effects are produced.

Even if the user that has set the exclusive use mode has forgotten to cancel the exclusive use mode, the terminal (exclusive-use terminal) that is exclusively using the printer is notified of a request for canceling the exclusive use mode after an elapse of a predetermined time. This helps the user become aware of an uncared-for leaving of the exclusive use mode, so that uncared-for leaving of the exclusive use mode can be prevented.

Also, in the event of a print request from a terminal other than the exclusive-use terminal in the exclusive use mode, the exclusive-use terminal is notified of a canceling request. Thus, the user can decide whether or not the exclusive use mode should be continued or canceled, depending on the priority order of jobs at that time.

Also, in the above case, after a response to the canceling request is made, the canceling request is not notified within a predetermined time period. Hence, when frequent print requests are issued from the other user within a short time period, the number of canceling requests of which the exclusive-use terminal is notified can be reduced, thus making it unnecessary for the exclusive-use user to make wasteful operations for responses.

Furthermore, in the event of a print request from a terminal other than the exclusive-use terminal in the exclusive use mode, the print data is stored in storage means. Thus, it becomes possible to output the print data after the cancellation of the exclusive use, making it unnecessary for the user to make a print request again and again, so that the working efficiency is improved.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. An image reproduction apparatus for reproducing an image based on image data sent from one of a plurality of image sources, said image reproduction apparatus comprising:
    a communication unit which communicates with said plurality of image sources; and
    a controller which sets said image reproduction apparatus in an exclusive use mode for being exclusively used by one of the image sources when said communication unit receives a request for exclusive use from said one of the image sources, and notifies said one of the image sources of a request for canceling the exclusive use mode through said communication unit when a predetermined condition is maintained under the exclusive use mode.

2. The image reproduction apparatus according to claim 1, wherein said predetermined condition is a condition where no signals are sent from said one of the image sources.

3. The image reproduction apparatus according to claim 1, wherein said controller includes a timer which measures maintained time of said predetermined condition, and wherein said controller notifies said one of the image sources of the request for canceling the exclusive use mode through said communication unit when a time measured by said timer becomes a predetermined time.

4. The image reproduction apparatus according to claim 1, wherein said controller compulsorily cancels the exclusive use-mode when said communication unit receives no reply to said request for canceling the exclusive use mode.

5. The image reproduction apparatus according to claim 1, wherein said controller includes a memory which stores data for identifying said one of the image sources.

6. The image reproduction apparatus according to claim 1, further comprising an image forming unit which forms an image on a sheet based on signals sent from one of the image sources through said communication unit.

7. A method for controlling an image reproduction apparatus for reproducing an image based on image data sent from one of a plurality of image sources, said method comprising the steps of:
    (a) setting said image reproduction apparatus in an exclusive use mode for being exclusively used by one of the image sources when said image reproduction apparatus receives a request for exclusive use from said one of the image sources; and
    (b) notifying said one of the image sources of a request for canceling the exclusive use mode when a predetermined condition is maintained under the exclusive use mode.

8. The method according to claim 7, wherein said predetermined condition is a condition where no signals are sent from said one of the image sources.

9. The method according to claim 7, further comprising a step (c) of measuring maintained time of said predetermined condition, wherein the step (b) is executed after a time measured in said step (c) becomes a predetermined time.

10. The method according to claim 7, further comprising a step (d) of canceling the exclusive use mode compulsorily when said image reproduction apparatus receives no reply to said request for canceling the exclusive use mode after the step (b).

11. An image reproduction apparatus for reproducing an image based on image data sent from one of a plurality of image sources, said image reproduction apparatus comprising:
    a communication unit which communicates with said plurality of image sources; and
    a controller which sets said image reproduction apparatus in an exclusive use mode for being exclusively used by one of the image sources when said communication unit receives a request for exclusive use from said one of the image sources, and cancels said exclusive use mode automatically and compulsorily when a predetermined condition is maintained under the exclusive use mode.

12. The image reproduction apparatus according to claim 11, wherein said predetermined condition is a condition where no signals are sent from said one of the image sources.

13. The image reproduction apparatus according to claim 11, wherein said controller includes a timer which measures maintained time of said predetermined condition, and wherein said controller cancels said exclusive use mode through said communication unit when a time measured by said timer becomes a predetermined time.

14. The image reproduction apparatus according to claim 11, wherein said controller includes a memory which stores data for identifying said one of the image sources.

15. The image reproduction apparatus according to claim 11, further comprising an image forming unit which forms an image on a sheet based on signals sent from each of the plurality of image sources through said communication unit.

16. A method for controlling an image reproduction apparatus for reproducing an image based on image data sent from one of a plurality of image sources, said method comprising the steps of:
    (a) setting said image reproduction apparatus in an exclusive use mode for being exclusively used by one of the image sources when said image reproduction apparatus receives a request for exclusive use from said one of the image sources; and
    (b) canceling said exclusive use mode automatically and compulsorily when a predetermined condition is maintained under the exclusive use mode.

17. The method according to claim 16, wherein said predetermined condition is a condition where no signals are sent from said one of the image sources.

18. The method according to claim 16, further comprising a step (c) of measuring maintained time of said predetermined condition, wherein the step (b) is executed after a time measured in the step (c) becomes a predetermined time.

19. An image reproduction apparatus for reproducing an image based on image data sent from one of a plurality of image sources, said image reproduction apparatus comprising:
    a communication unit which communicates with the plurality of image sources; and
    a controller which sets said image reproduction apparatus in an exclusive use mode for being exclusively used by one of the image sources when the communication unit receives a request for exclusive use from said one of the image sources, and notifies said one of the image sources of a request for canceling the exclusive use mode through said communication unit when said communication unit receives a request for an image reproduction from the other one of said image sources when said one of the image sources is under the exclusive use mode.

20. An image reproduction apparatus for reproducing an image based on image data sent from one of a plurality of image sources, said image reproduction apparatus comprising:

a communication unit which communicates with the plurality of image sources; and a controller which sets the image reproduction apparatus in an exclusive use mode for being exclusively used by one of the image sources when said communication unit receives a request for exclusive use from said one of the image sources, and cancels the exclusive use mode when said communication unit receives a request for an image reproduction from the other one of said image sources when said one of the image sources is under the exclusive use mode.

* * * * *